United States Patent [19]

Kudo et al.

[11] Patent Number: 4,504,514

[45] Date of Patent: Mar. 12, 1985

[54] SOYBEAN-BASED FIBROUS OR GRANULAR FOOD MATERIAL HAVING IMPROVED TEXTURE

[75] Inventors: Shiro Kudo, Ito; Megumi Mukaiyama, Shimonia, both of Japan

[73] Assignees: Asahi-matsu Foods Inc., Nagano; Takeda Chemical Industries, Ltd., Osaka, both of Japan

[21] Appl. No.: 435,393

[22] Filed: Oct. 19, 1982

[30] Foreign Application Priority Data

Oct. 22, 1981 [JP] Japan ................................ 56-168954
Nov. 20, 1981 [JP] Japan ................................ 56-186471

[51] Int. Cl.³ ........................... A23J 3/00; A23L 1/20
[52] U.S. Cl. ..................................... 426/634; 426/656; 426/104; 426/802
[58] Field of Search ............... 426/104, 634, 656, 802, 426/331

[56] References Cited

U.S. PATENT DOCUMENTS

| | | | |
|---|---|---|---|
| 3,645,746 | 2/1972 | Atkinson | 426/331 |
| 3,812,267 | 5/1974 | Atkinson | 426/656 X |
| 3,870,805 | 3/1975 | Hayes et al. | 426/656 X |
| 3,911,159 | 10/1975 | Heusdens | 426/802 X |
| 3,966,977 | 6/1976 | Levinson et al. | 426/802 X |
| 4,154,856 | 5/1979 | Akin | 426/802 X |
| 4,191,783 | 3/1980 | Burkwall, Jr. et al. | 426/331 X |
| 4,204,005 | 5/1980 | Kudo et al. | |
| 4,321,280 | 3/1982 | Roy et al. | 426/802 X |

*Primary Examiner*—Robert Yoncoskie
*Attorney, Agent, or Firm*—Wenderoth, Lind & Ponack

[57] ABSTRACT

A soybean-based fibrous or granular food material having improved texture can be produced by incorporating edible organic acid having 2 to 6 carbon atoms and/or metal cations in a form of edible salt into fibrous or granular food material. The thus obtained food material is useful as an ingredient of meat products, fish products and son on. The fibrous or granular food material is prepared by grinding soybean material between two grindstone plates of a colloid mill.

7 Claims, No Drawings

SOYBEAN-BASED FIBROUS OR GRANULAR FOOD MATERIAL HAVING IMPROVED TEXTURE

The present invention relates to a soybean-based fibrous or granular material having improved texture and a method for production thereof.

One of the present inventors, Shiro Kudo, and a co-inventor developed a process for producing soybean-based food materials which are fibrous or granular in appearance, have appropriate elasticity and meat-like texture, and are dried to produce dried food materials capable of being restored to their original form, retaining completely their form and shape and presenting their original elasticity and meat-like texture when treated cold water or hot water. The process has been patented as U.S. Pat. No. 4,204,005 (hereinafter referred to as prior invention).

The process according to the prior invention is characterized by soaking for example whole grains of soybean as such in water to give them a suitable water content (water content of 30 to 60 weight percent), heat-treating the whole grains of soybean as such, whereby trypsin inhibitor and riboxygenase are deactivated to remove bad smell and unfavorable taste of the soybean, and a suitable extent of denaturation due to heating is simultaneously allowed to take place, then adjusting the water content after peeling is effected if necessary, and passing or grinding the whole grains of soybean as such through an extremely narrow gap (desirably in the region of 0.02 to 0.2 mm) between two grindstone plates of a colloid mill in rotation at a high speed. More specifically in accordance with the prior invention, a soybean-based fibrous or granular food material is produced by adjusting the water content of whole grains of soybean to between 10–65, preferably 20–65 weight percent and grinding said grains between two opposing disc grinding members separated by a gap not larger than 1 mm, wherein one of the grinding members rotates at a peripheral speed from 8 to 8000 m/min, and wherein the opposing discs are concave to form a central hollow portion therebetween having an approximately trapezoidal cross section. The soybean-based fibrous or granular materials thus produced in themselves possess a peculiar texture, and provide adequate resistance-to-teeth to foods prepared therefrom. Nevertheless, a specific type of food to be prepared therefrom and a special way of cooking require in some instances a higher degree of hardness than the resistance-to-teeth of such materials.

However, the thus produced soybean-based fibrous or granular food material exhibits a decreased texture evaluation index of about 50 to 60 when treated with hot water at 75° C. and displays a texture evaluation index lowered to the neighborhood of 30 when boiled, if the texture evaluation index when the material is treated with water at 20° C. is taken as 100. Therefore, said food material is limited in the application to foods which involve heating during the routine production process or in the course of cooking.

The reason why the soybean-based fibrous or granular materials get soft by heating with hot water is assumed to be that when the materials with inadequate denaturation are soaked in hot water, non-denatured proteins are eluted together with soluble components in soybean, or non-denatured proteins become more hydrophilic.

In view of the above, the present inventors conducted extensive research with a specific view to solve these problems and expand the scope of application of a soybean-based fibrous or granular food material according to the prior invention.

According to the present invention there is provided a soybean-based fibrous or granular food material having improved a texture, which comprises metal cations in a form of edible salt and/or edible organic acid having 2 to 6 carbon atoms incorporated into soybean-based fibrous or granular food material.

In the present invention, the fiberization or granulation processing treatment per se of soybean is carried out in accordance with the process as shown in the prior invention (U.S. Pat. No. 4,204,005), characterized in that said process comprises grinding with a colloid mill soybean with a water content of about 30 to about 60 weight percent to form fibrous or granular material.

The soybeans to be employed according to the present invention may be whole grains of soybean and their processed matters having higher soy protein content as compared with the original soybean. As such processed matters, there may be mentioned defatted soybean, soy protein concentrate, soy protein isolate or the like.

Among those, whole grains of soybean and defatted soybean are more preferably used in this invention.

In the production of the soybean-based fibrous or granular food material of the present invention, metal cations in a form of edible salt are incorporated into fibrous or granular food material, in the range of about 0.03 to about 0.6 gram equivalents, preferably 0.1 to 0.4 gram equivalents, on a dry basis, relative to one kilogram of the soybean material, at any stage of the process.

As the metal cations, there may be employed di- or tri-valent metals to accelerate denaturation of soybean protein by heating in the form of edible salts, such as calcium salts (e.g. calcium chloride, calcium sulfate, calcium carbonate, calcium citrate or calcium phosphate), magnesium salts (e.g. magnesium chloride, magnesium sulfate or magnesium carbonate), aluminium salts (e.g. aluminium chloride or alum), ferrous or ferric salts (e.g. ferrous chloride, ferrous sulfate, ferrous citrate, ferric chloride, ferric sulfate) and so on.

Among the above-mentioned salts, calcium chloride is the most effective and relatively cheap from the standpoint of costs. Calcium sulfate, calcium carbonate and magnesium sulfate are of nearly equivalent effect, although they are less effective than calcium chloride at the same addition level. Alum can be expected to have an effect equal to calcium chloride, but when judged from the fact that calcium chloride is cheaper, calcium chloride is considered favorable.

While the amount of the edible metal salts to be thus employed depends upon the type of salts, it is undesirable to add an amount exceeding 0.6 gram equivalent, on a dry basis, per one kilogram of the soybean material because an undesirable taste is assumed.

The method and stage of incorporation of the edible metal salt are unlimited for practical purposes. The metal salt may be incorporated into soybean material before, during or after the fiberization or granulation process.

Preferably, such a salt is dissolved or dispersed in water, for example, in a concentration of about 5 to 70 weight percent, and the thus prepared solution or dispersion is premixed with soybean by using a mincer or a mixer, and then the mixture is subjected to fiberization or granulation processing treatment. The incorporation of such a salt may also be conducted by soaking a soybean-based material after fiberization or granulation in an aqueous solution or dispersion prepared as above.

Thus, hardness of soybean-based fibrous or granular food material according to the present invention can be freely controlled by changing the type and amount of metal salts to be added.

In the present invention, a soybean-based fibrous or granular food material having good texture can also be produced by incorporating about 0.01 to about 2 gram equivalents, preferably about 0.05 to about 1 gram equivalent, of an edible organic acid having 2 to 6 carbon atoms, on a dry basis, relative to one kilogram of the foods material, into the soybean material.

The aforementioned organic acid may be any of the monocarboxylic acids, dicarboxylic acids, tricarboxylic acids, etc. The monocarboxylic acids include lower fatty acids, monocarboxylic acids having 1 to 5 hydroxyl groups, among others. The di- or tri-carboxylic acids may for instance be alkane-di or tri-carboxylic acids (with 2 to 3 carboxyl groups attached to optional positions of an alkane chain). Such alkane chains may be substituted in optional positions by hydroxyl and the number of such hydroxyl groups is 1 to 3.

The edible organic acid to be employed according to this invention involves lactones which change to acids by heating.

As examples of such organic acids, there may be mentioned acetic acid, fumaric acid, ascorbic acid, lactic acid, gluconic acid, glucuronic acid, malonic acid, succinic acid, citric acid, tartaric acid, malic acid, glutamic acid, folic acid, aspartic acid, glucono-δ-lactone, etc. In the case of a polybasic acid, there are cases in which at least one of its carboxyl groups is free, with the other carboxyl group or groups being in the form of an ester or salt. Among those water-soluble aliphatic carboxylic acids, acetic acid, citric acid, glucono-δ-lactone, etc. are particularly desirable for practical purposes.

Occasionally, an edible inorganic acid (e.g. hydrochloric acid, phosphoric acid, carbonic acid) can also be employed in the present invention.

The following methods are preferably carried out to incorporate the edible organic acid as mentioned above into fibrous or granular food material.

For instance, it may be preferable to subject the fibrous or granular food material, produced by the prior invention, to treatment by soaking, blanching or spraying by means of an acid solution having a pH of not more than pH 5, preferably pH 4 to 5, or McIlvaine's buffer solution, etc. In case of citric acid, for example, it is most effective to subject the material to directly soaking in, blanching with, or spraying with a 2 to 5% solution.

After such treatment is conducted, excessive water is removed and drying is effected, if necessary. The soybean-based fibrous or granular food material subjected to such treatment, when restored with water at 20° C., showed not less than 1.7 times higher hardness than the non-treated one. In addition, even when treated with hot water, its hardness does not decrease.

The point to be considered for this process is that soluble components get eluted during soaking; for example, in the case of soaking in a 2 weight percent citric acid solution for 10 min., there takes place a loss of about 20 weight percent or so of the total solid content. Since almost all soluble components are saccharides or sugars, such phenomenon is regarded as favorable, when saccharides or sugars are to be eliminated from such soybean-based fibrous or granular food material. But, when taking into account a loss of raw materials, the procedure of soaking and blanching cannot always be said to be preferable.

As far as such point is concerned, the procedure of spraying with a minimum amount of the above organic acid solution is comparatively good, and is the most realistic and best one among the aforementioned procedures, although it suffers from a slight drawback of causing unevenness in spraying, etc. in the case of a large-scale treatment.

In case that acetic acid is employed, its incorporation is advantageously carried out by allowing a soybean-based fibrous or granular food material to stand in an atmosphere of volatilized acetic acid.

Thus, acetic acid is a highly volatile, strong acid, and while taking advantage of such volatility, acetic acid is placed in a tightly closed room, with the air in the room being circulated, if necessary, to create the atmosphere containing acetic acid; then, the soybean fibers or granules produced previously (either before or after being dried) are allowed to stand therein for a certain period of time, whereby there can be produced higher hardness than in the case of soaking in the above organic acid solution. If necessary, the specimen having been treated with acetic acid is forcibly aerated for a little while to drive out the excess acetic acid and then pouched in bags. The thus obtained food material is free from odour of acetic acid and has an adequate hardness. In addition, this procedure offers the advantage that the fibers and granules can be allowed to stand in the atmosphere of acetic acid for a further long period of time without any change, thus outstandingly facilitating the process control.

In case that lactones such as glucono-δ-lactone are employed, they can also be incorporated into a soybean-based fibrous or granular material before or during fiberization or granulation treatment, because they give no harmful effect on the formation of fibers or granules. Particularly, premixing of such lactones with soybeans as the raw material is preferable.

In the present invention, organic acids may be employed in combination with the edible metal salts as mentioned above.

The thus obtained soybean-based fibrous or granular food material is dried to a water content of about 6 to about 15 weight percent, if necessary. Drying may be carried out by a conventional method such as drying under aerating at 60° to 95° C.

The soybean-based fibrous or granular food material of the present invention has higher hardness than that obtained by the method of the prior invention (U.S. Pat. No. 4,204,005), and its hardness does not decrease even when treated with hot water. Therefore, the food material of this invention can be more advantageously used as an additive or as a raw material including any and all types of foods which involve heating during the routine production process or in the course of cooking.

Furthermore, the process of this invention produces a tender and bland fibrous or granular food material which can be incorporated into meat or fish products to provide a pleasing taste and mouthfeel and to form a food product which is acceptable for human consumption.

Among these products are meat processed food such as corned beef, meat balls, hamburg steak, meat sauce or dried sausage; fish processed food such as fish sticks, mashed and seasoned fish, fish flakes or the like.

Examples are described below to further illustrate the present invention.

EXAMPLE 1

Five kilograms of whole grains of soybean were washed with water and soaked in water to a water content of about 50%, while 70 g of anhydrous calcium chloride was dissolved in about 150 ml of water. The soybean, together with the solution of calcium chloride, was subjected to a mincer, and the mixture was passed between two grindstone plates revolving at 1800 r.p.m. while being kept extremely closely spaced (clearance: 0.10 mm) to thereby be crushed and converted into fibrous material, followed by drying to a water content in the neighborhood of 13% to obtain about 5 kg of a product. As controls, a soybean-based fibrous food material without anhydrous calcium chloride was also prepared.

The products were treated with water of 20° C. and hot water of 75° C. for 30 minutes, respectively, and excess water was removed. Their hardness was measured by Texturometer (Zenken Co. Ltd., Japan). The results are as shown in the following Table.

|  | at 20° C. | at 75° C. | Ratio of change (75° C./20° C.) |
| --- | --- | --- | --- |
| Control | 8.3 | 4.6 | 0.55 (55%) |
| Calcium chloride added | 8.5 | 8.9 | 1.05 (105%) |

(Unit: Texturo Unit)
Note:
Control sample was produced by no addition of glucono-δ-lactone.

As is clear from the above results, the soybean-based fibrous food material obtained by the present invention shows higher hardness than that of control (calcium chloride-free), even when they are treated with hot water at 75° C.

EXAMPLE 2

Five kilograms of whole grains of soybean were treated in the same manner as in Example 1, except using 40 g of glucono-δ-lactone in place of calcium chloride of Example 1, to form in a fibrous material by the same procedure, which was then dried to a water content in the neighborhood of about 14% to obtain about 5 kg of a product. The product was treated with water of 20° C. and hot water of 75° C., respectively, and subjected to measurement by a Texturometer, after excess water was removed. Hardness values of the samples are shown in the following Table.

|  | at 20° C. | at 75° C. | Ratio of change (75° C./20° C.) |
| --- | --- | --- | --- |
| Control | 8.1 | 4.9 | 0.60 (60%) |
| Glucono-β-lactone added | 9.8 | 9.3 | 0.95 (95%) |

(Unit: Texturo Unit)
Note:
Control sample was produced by no addition of glucono-δ-lactone.

EXAMPLE 3

Five kilograms of whole grains of soybean were treated in the same manner as in Example 1, while 100 g of calcium sulfate in place of calcium chloride in Example 1 was well dispersed in 200 ml of water, followed by subjecting the mixture to a mincer. The mixture was formed into fibrous material, which was dried to a water content in the neighborhood of 14% to obtain about 5 kg of a product. Hardness values were measured by the same manner as mentioned above.

|  | at 20° C. | at 75° C. | Ratio of change (75° C./20° C.) |
| --- | --- | --- | --- |
| Control | 7.8 | 4.4 | 0.56 (56%) |
| Calcium sulfate added | 8.3 | 7.5 | 0.90 (90%) |

(Unit: Texturo Unit)
Note:
Control sample was produced by no addition of calcium sulfate.

EXAMPLE 4

Five kilograms of whole grains of soybean were treated in the same manner as in Example 1, and formed as such into fibrous material, followed by soaking directly in 10 l of a 2% citric acid solution prepared in advance for 5 minutes. After excess water was removed, the formed material was dried to a water content in the neighborhood of 13%. Hardness values are as follows:

|  | at 20° C. | at 75° C. | Ratio of change (75° C./20° C.) |
| --- | --- | --- | --- |
| Control[1] | 8.0 | 4.6 | 0.58 (58%) |
| Calcium chloride and citric acid added[2] | 11.8 | 11.2 | 0.95 (95%) |

(Unit: Texturo Unit)
Note:
[1]Control sample was produced by no addition of calcium chloride and citric acid.
[2]Citric acid content: 4.9 weight % and calcium chloride content: 1.6 weight %.

EXAMPLE 5

Soybean fibers produced by the same procedure as in Example 1 were placed in a desiccator having its bottom filled with acetic acid, allowed to stand therein for 3 hours, taken out and dried to obtain about 5 kg of a product with a water content of about 13%. Hardness values are as follows:

|  | at 20° C. | at 75° C. | Ratio of change (75° C./20° C.) |
| --- | --- | --- | --- |
| Control[1] | 8.3 | 4.7 | 0.57 (57%) |
| Calcium chloride and acetic acid added[2] | 12.3 | 11.9 | 0.97 (97%) |

(Unit: Texturo Unit)
Note:
[1]Control sample was produced by no addition of calcium chloride and acetic acid.
[2]Calcium chloride content: 1.6 weight %, acetic acid content: 0.9 weight % on a dry basis.

EXAMPLE 6

The sample as prepared in Example 1 was dried to a water content in the neighborhood of 12%, then allowed to stand overnight (about 12 hours) in the desiccator as in Example 5, and aerated by an electric fan for about 10 minutes to evaporate the acetic acid. Hardness values are as follows:

|  | at 20° C. | at 75° C. | Ratio of change |
| --- | --- | --- | --- |
| Control[1] | 8.3 | 4.7 | 0.57 (57%) |
| Calcium chloride and | 12.5 | 12.2 | 0.98 (98%) |

| | at 20° C. | at 75° C. | Ratio of change |
|---|---|---|---|
| acetic acid added[2] | | | |

(Unit: Texturo Unit)
Note:
[1]Control sample was produced by no addition of calcium chloride and acetic acid.
[2]Acetic acid content 0.9 weight %, calcium chloride content 1.6 weight % on a dry basis.

EXAMPLE 7

Five kilograms of whole grains of soybean were treated in the same manner as in Example 1 except that anhydrous calcium chloride was not added. The obtained fibrous material was soaked for 5 minutes in 10 l of a 2% citric acid solution and dried to a water content in the neighborhood of 9%, after excess solution was removed. Hardness values are shown in the following Table.

| | at 20° C. | at 75° C. | Ratio of change (75° C./20° C.) |
|---|---|---|---|
| Control[1] | 8.0 | 4.6 | 0.58 (58%) |
| Citric acid added[2] | 11.8 | 11.2 | 0.95 (95%) |

(Unit: Texturo Unit)
Note:
[1]Control sample was produced by no addition of citric acid.
[2]Citric acid content: 4.9 weight % on a dry basis.

EXAMPLE 8

The soybean fibers as produced by the same procedure as in Example 1 except that anhydrous calcium chloride was not added were allowed to stand for 3 hours in a desiccator having the bottom filled in advance with acetic acid, then taken out and dried to a water content of about 13% to obtain about 5 kg of a product. Hardness values are shown in the following Table.

| | at 20° C. | at 75° C. | Ratio of change (75° C./20° C.) |
|---|---|---|---|
| Control[1] | 8.3 | 4.7 | 0.57 (57%) |
| Acetic acid added[2] | 12.3 | 11.9 | 0.97 (97%) |

(Unit: Textro Unit)
Note:
[1]Control sample was produced by no addition of acetic acid.
[2]Acetic acid content: 0.75 weight % on a dry basis.

EXAMPLE 9

The sample as prepared in Example 8 was dried in advance to a water content in the neighborhood of 13%, and allowed to stand overnight (about 12 hours) in a desiccator as in Example 8, followed by evaporating acetic acid by an electric fan for about 10 minutes. Hardness values are shown in the following Table.

| | at 20° C. | at 75° C. | Rate of change |
|---|---|---|---|
| Control[1] | 8.3 | 4.7 | 0.57 (57%) |
| Acetic acid added[2] | 12.5 | 12.2 | 0.98 (98%) |

(Unit: Texturo Unit)
Note:
[1]Control sample was produced by no addition of acetic acid.
[2]Acetic acid content: 0.9 weight % on a dry basis.

EXAMPLE 10

To 5 kg of defatted soybean flour, 4 kg of aqueous solution containing 45 g of magnesium chloride was added, thoroughly kneaded and heated for 5 minutes in an electric range (microwave oven), until the water content reached 42%, and then formed into fibrous form by the same procedure as in Example 1. The resultant fibers were harder than that of magnesium chloride-free fibers when boiled in water for 30 minutes.

REFERENCE EXAMPLE 1

The muscle fibers of 3 kg of beef, which were cured and steamed, were disintegrated and fed into a mixer, to which 1.5 kg of the soybean-based fibrous food material obtained by the present invention (Example 9), 1 kg of beef tallow, 5 kg of meat juice, 10 g of monosodium glutamate, 25 g of cane sugar, 15 g of pepper, 5 g of all spice and 10 g of onion powder were added. The ingredients were evenly mixed together and the resulting blend was filled into a can, and then degassed. The can was clinched and sterilized in a retort at 110° C. for 90 minutes, followed by cooling. The procedure yields 10 kg of canned corned beef (Test product). At the same time, a control product was prepared from an acetic acid-free soybean-based fibrous material.

The texture of these products was evaluated by a panel of 20 expert testers using an evaluation scale of −3 to +3.

The result was that the product incorporated with the soybean-based fibrous food material of the present invention had harder and better texture than that of the control product.

| | Sensory tests | |
|---|---|---|
| | Hardness | Total evaluation of texture |
| Control | 0.11 | 0.05 |
| Test product | +1.85* | +2.50* |

*significant at 5% level
−3: dislike extremely,
−1: dislike slightly,
+1: like slightly,
+3: like extremely
−2: dislike moderately,
0: neither like nor dislike,
+2: like moderately,

What we claim is:

1. A soybean-based fibrous or granular food material which comprises (1) fibrous or granular material produced by adjusting the water content of soybean material to between about 30 to about 60 weight percent and grinding said soybean material between two opposing disc grinding members separated by a gap not larger than 1 mm, wherein one of the grinding members rotates at a peripheral speed from 8 to 8000 m/min, and wherein the opposing discs are concave to form a central hollow portion therebetween having an appoximately trapezoidal cross section, said fibrous or granular material being impregnated with both (2) about 0.01 to about 2 gram equivalents of acetic acid, and (3) about 0.03 to about 0.6 gram equivalent of an edible calcium or magnesium salt, the amounts of said acid and salt being per kilogram of the soybean material on a dry basis.

2. The food material according to claim 1, wherein the edible salt is a calcium salt.

3. The food material according to claim 2, wherein the calcium salt is calcium chloride.

4. The food material according to claim 2, wherein the calcium salt is calcium sulfate.

5. A soybean-based fibrous or granular food material which comprises (1) fibrous or granular material produced by adjusting the water content of soybean material to between about 30 to about 60 weight percent and grinding said soybean material between two opposing disc grinding members separated by a gap not larger than 1 mm, wherein one of the grinding members rotates at a peripheral speed from 8 to 8000 m/min, and wherein the opposing discs are concave to form a central hollow portion therebetween having an approximately trapezoidal cross section, said fibrous or granular material being impregnated with (2) about 0.01 to about 2 gram equivalents of acetic acid per kilogram of the soybean material on a dry basis.

6. A method for producing a soybean-based fibrous or granular food material which comprises:
   (1) adjusting the water content of soybean material to between about 30 to about 60 weight percent;
   (2) grinding said soybean material to form fibrous or granular material between two opposing disc grinding members separated by a gap not larger than 1 mm, wherein one of the grinding members rotates at a peripheral speed from 8 to 8000 m/min, and wherein the opposing discs are concave to form a central hollow portion therebetween having an appoximately trapezoidal cross section; and
   (3) allowing said fibrous or granular material to stand in an atmosphere of volatilized acetic acid until about 0.01 to about 2 gram equivalents of acetic acid per kilogram of the soybean material on a dry basis is impregnated therein.

7. The method according to claim 6, which further comprises incorporating an edible calcium or magnesium salt in an amount of about 0.03 to about 0.6 gram equivalent, per kilogram of the soybean material, into the soybean material.

* * * * *